(12) United States Patent
Chang

(10) Patent No.: US 12,356,447 B2
(45) Date of Patent: Jul. 8, 2025

(54) CONTROL METHOD EMPLOYED BY WIRELESS FIDELITY MULTI-LINK DEVICE FOR DEALING WITH MULTI-LINK COHERENT OPERATION

(71) Applicant: MEDIATEK INC., Hsin-Chu (TW)

(72) Inventor: Cheng-Yi Chang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 451 days.

(21) Appl. No.: 17/964,045

(22) Filed: Oct. 12, 2022

(65) Prior Publication Data

US 2023/0123499 A1    Apr. 20, 2023

Related U.S. Application Data

(60) Provisional application No. 63/255,452, filed on Oct. 14, 2021.

(51) Int. Cl.
| | |
|---|---|
| *H04W 74/08* | (2024.01) |
| *H04B 7/0408* | (2017.01) |
| *H04W 24/10* | (2009.01) |
| *H04W 76/16* | (2018.01) |
| *H04W 84/12* | (2009.01) |

(52) U.S. Cl.
CPC .......... *H04W 74/08* (2013.01); *H04B 7/0408* (2013.01); *H04W 24/10* (2013.01); *H04W 76/16* (2018.02); *H04W 84/12* (2013.01)

(58) Field of Classification Search
None
See application file for complete search history.

(56) References Cited

U.S. PATENT DOCUMENTS

| | | |
|---|---|---|
| 2021/0014911 A1 | 1/2021 | Patil |
| 2021/0144698 A1 | 5/2021 | Kwon |
| 2022/0141785 A1 | 5/2022 | Gan |
| 2022/0330344 A1 | 10/2022 | Lou |
| 2024/0040646 A1* | 2/2024 | Ma ................... H04W 52/0216 |
| 2024/0137979 A1* | 4/2024 | Kim ..................... H04L 5/0096 |
| 2024/0163948 A1* | 5/2024 | Kim ....................... H04W 8/24 |
| 2024/0251282 A1* | 7/2024 | Kim ..................... H04W 74/08 |

(Continued)

FOREIGN PATENT DOCUMENTS

WO    2021/008502 A1    1/2021

OTHER PUBLICATIONS

Sharan Naribole et al., MLD Spatial Multiplexing Considerations, IEEE 802.11-20/0977r2, Jul. 2020, pp. 1-18, IEEE, Jul. 15, 2020, XP068172949.

(Continued)

*Primary Examiner* — Anh Vu H Ly
(74) *Attorney, Agent, or Firm* — Winston Hsu

(57) ABSTRACT

A control method employed by a wireless fidelity (Wi-Fi) multi-link device (MLD) includes: in response to gaining access of a first link at a first time point through channel contention, enabling a multi-link coherent operation mode on the first link for performing frame exchange process on the first link by using N spatial streams, wherein N is a positive integer not smaller than 2; and in response to gaining access of a second link at a second time point through channel contention, blocking the multi-link coherent operation mode from being enabled on the second link, wherein performance of the second link is lower than performance of the first link.

21 Claims, 8 Drawing Sheets

(56) References Cited

U.S. PATENT DOCUMENTS

2024/0292463 A1* 8/2024 Kim .................... H04W 74/006
2024/0314713 A1* 9/2024 Seok ................... H04W 56/006
2024/0349377 A1* 10/2024 Ambede ........... H04W 28/0967

OTHER PUBLICATIONS

35. Extremely high throughput (EHT) MAC specification, IEEE P802.11be/D0.2, Dec. 2020, pp. 1-25, IEEE, XP068183800, Dec. 2020.
Dmitry Akhmetov et al., Discussion on methods for synchronous ML operations, IEEE 802.11-20/993r0, Jul. 2020, pp. 1-23, IEEE, Jul. 3, 2020, XP068172888.
Dmitry Akhmetov et al., Intel, "Discussion on methods for synchronous ML operations", IEEE 802.11-20/993r0, Jul. 3, 2020, XP068172888, pp. 1-23. ,Jul. 3, 2020.

* cited by examiner

CONTROL METHOD EMPLOYED BY WIRELESS FIDELITY MULTI-LINK DEVICE FOR DEALING WITH MULTI-LINK COHERENT OPERATION

CROSS REFERENCE TO RELATED APPLICATIONS

This application claims the benefit of U.S. Provisional Application No. 63/255,452, filed on Oct. 14, 2021. The content of the application is incorporated herein by reference.

BACKGROUND

The present invention relates to wireless communications, and more particularly, to a control method employed by a wireless fidelity (Wi-Fi) multi-link device (MLD) for dealing with a multi-link coherent operation.

In a Wi-Fi multi-link operation (MLO), there may exist several links between two MLDs, including one access point (AP) and one non-AP station (STA), that occupy different radio-frequency (RF) bands. These links can operate independently to increase the overall throughput and/or to improve the connection stability. However, each link has its own capacity that is based on several parameters, including bandwidth (BW), number of spatial streams (NSS), modulation and coding mechanism (MCS), etc. In addition, each link has its own condition that is based on several parameters, including loading, interference, etc. Capacities and conditions of links can be very different. Hence, it is desirable to optimally utilize these asymmetric links to maximize the overall system performance.

SUMMARY

One of the objectives of the claimed invention is to provide a control method employed by a wireless fidelity (Wi-Fi) multi-link device (MLD) for dealing with a multi-link coherent operation.

According to a first aspect of the present invention, an exemplary control method employed by a wireless fidelity (Wi-Fi) multi-link device (MLD) is disclosed. The exemplary control method includes: in response to gaining access of a first link at a first time point through channel contention, enabling a multi-link coherent operation mode on the first link for performing frame exchange process on the first link by using N spatial streams, wherein N is a positive integer not smaller than 2; and in response to gaining access of a second link at a second time point through channel contention, blocking the multi-link coherent operation mode from being enabled on the second link, wherein performance of the second link is lower than performance of the first link.

According to a second aspect of the present invention, an exemplary control method employed by a wireless fidelity (Wi-Fi) multi-link device (MLD) is disclosed. The exemplary control method includes: in response to gaining access of a first link through channel contention, enabling a multi-link coherent operation mode on the first link for performing frame exchange process on the first link by using N spatial streams, and aligning an end time of the frame exchange process on the first link with an end time of another frame change that is performed on a second link occupied by another Wi-Fi device, wherein performance of the second link is higher than performance of the first link, and N is a positive integer not smaller than 2.

According to a third aspect of the present invention, an exemplary control method employed by a wireless fidelity (Wi-Fi) multi-link device (MLD) is disclosed. The exemplary control method includes: before a first backoff counter of a first link reaches zero and a second link is occupied, holding the first backoff counter for one or more slot times to wait for the chance of gaining access of the second link through channel contention, wherein performance of the second link is higher than performance of the first link.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
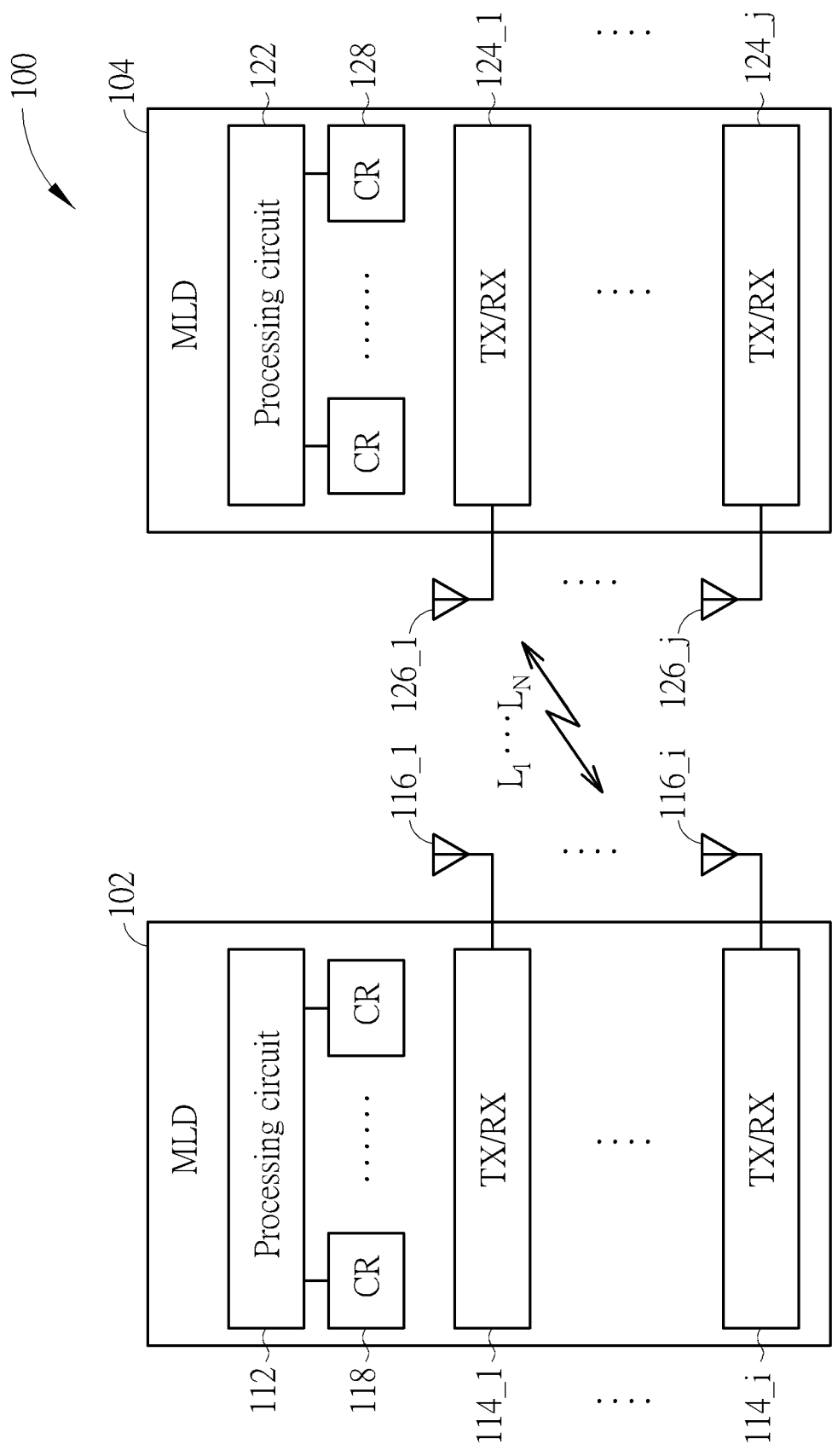
FIG. 1 is a diagram illustrating a wireless fidelity (Wi-Fi) system according to an embodiment of the present invention.

FIG. 1 is a diagram illustrating a wireless fidelity (Wi-Fi) system according to an embodiment of the present invention. For brevity and simplicity, it is assumed that the Wi-Fi system 100 includes two multi-link devices (MLDs) 102 and 104, where one of the MLDs 102 and 104 may be an access point (AP), and the other of the MLDs 102 and 104 may be a non-AP station (STA). For example, the MLD 102 acts as an AP MLD, and the MLD 104 acts as a non-AP MLD. For another example, the MLD 102 acts as a non-AP MLD, and the MLD 104 acts as an AP MLD. In some embodiments, the AP MLD may own M links $L_1$-$L_M$, and may communicate with the non-AP MLD via N links $L_1$-$L_N$, where M and N are positive integers, N is not smaller than 2, and M is not smaller than N. Regarding the MLD 102, it may include a processing circuit 112, a plurality of transceivers (labeled by "TX/RX") 114_1-114_i, and a plurality of antennas 116_1-116_i, where i is a positive integer not smaller than 2. Like the MLD 102, the MLD 104 may include a processing circuit 122, a plurality of transceivers (labeled by "TX/RX") 124_1-124_i, and a plurality of antennas 126_1-126_j, where j is a positive integer not smaller than 2. In a case where the MLD 102 acts as an AP MLD and the MLD 104 acts as a non-AP MLD, i may be equal to M, and j may be equal to N, where M≥N.

In another case where the MLD 102 acts as a non-AP MLD and the MLD 104 acts as an AP MLD, i may be equal to N, and j may be equal to M, where M≥N. The transceivers 114_1-114_i of the MLD 102 can communicate with the transceivers 114_1-114_j of the MLD 104 via multiple links $L_1$-$L_N$. In this embodiment, each of the links $L_1$-$L_N$ may be defined by a channel of a band. For example, the links $L_1$-$L_N$ may include different channels of the same band (e.g. A band (2.4 GHz band) or G band (5 GHz band)) and/or channels of different bands (e.g. A band (2.4 GHz band) and G band (5 GHz band)). In other words, the proposed multi-link coherent operation can be applicable for any asymmetric multi-links, including A+G (two links), A+A+G (three links), A+A+A+G (four links), A+A+G+G (four links), A+A+A+G+G (five links), etc. For better comprehension of technical features of the proposed multi-link coherent operation, the following assumes that the asymmetric multi-links include one link at the 5 GHz band and one link at the 2.4 GHz band.

By way of example, but not limitation, the processing circuit 112/122 is arranged to perform a control method for dealing with the proposed multi-link coherent operation. For example, the processing circuit 112 of the MLD 102 may be implemented by a processor that operates according to a plurality of control registers (CRs) 118, and the processing circuit 122 of the MLD 104 may be implemented by a processor that operates according to a plurality of control registers (CRs) 128. In some embodiments of the present invention, one or both of the MLDs 102 and 104 may be simultaneous transmit receive (STR) MLDs that supports a multi-link coherent operation mode such as an enhanced multi-link single-radio (EMLSR) operation mode or an enhanced multi-link multi-radio (EMLMR) operation mode. In some embodiments of the present invention, one or both of the MLDs 102 and 104 may be non-simultaneous transmit receive (NSTR) MLDs that supports a multi-link coherent operation mode such as an EMLSR operation mode or an EMLMR operation mode. However, these are for illustrative purposes only, and are not meant to be limitations of the present invention. Further details of the proposed multi-link coherent operation are provided as below with reference to the accompanying drawings.

Figure 2:
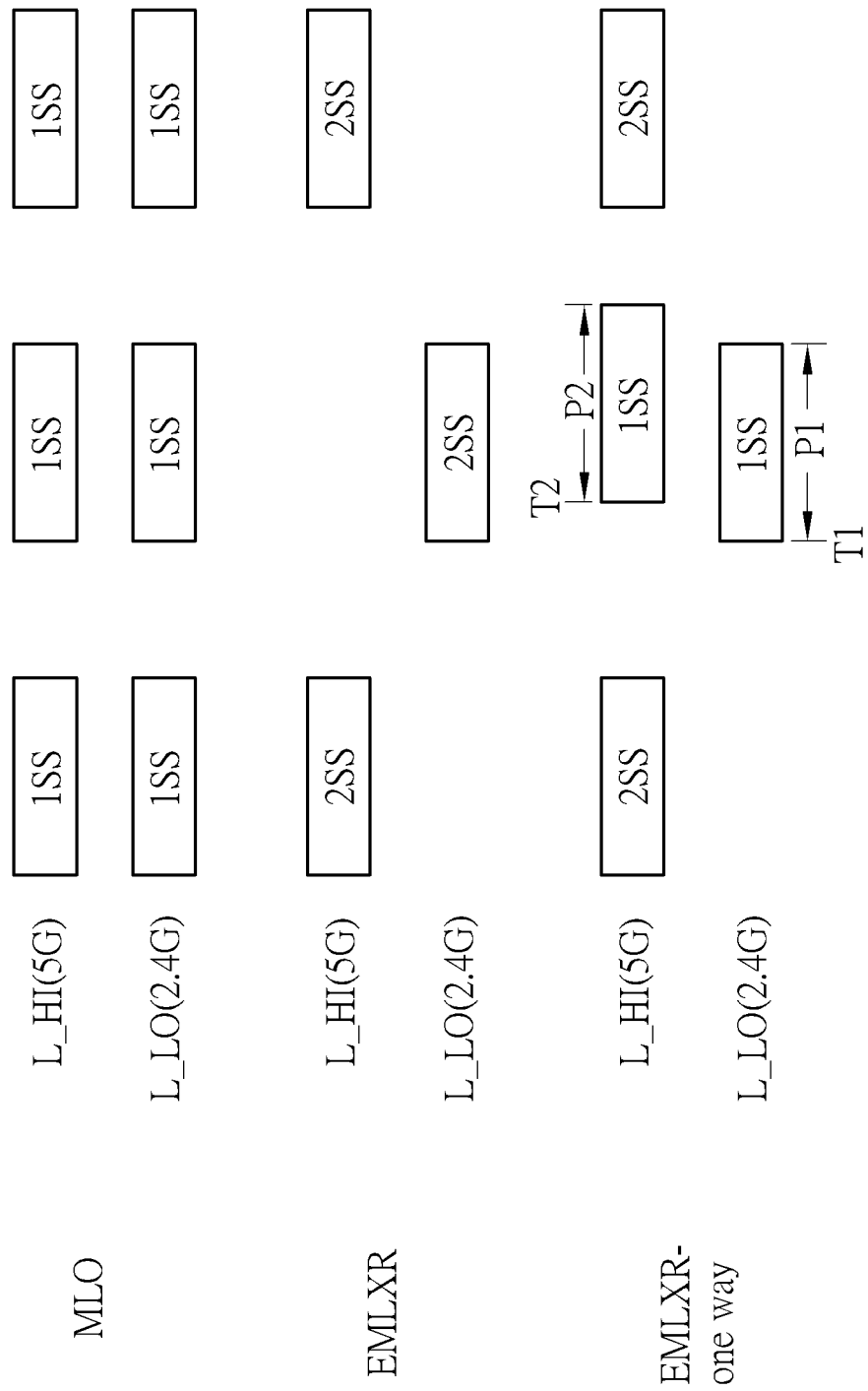
FIG. 2 is a diagram illustrating a multi-link coherent operation with one-way switch EMLXR according to an embodiment of the present invention.

FIG. 2 is a diagram illustrating a multi-link coherent operation with one-way switch EMLXR according to an embodiment of the present invention. The term "EMLXR" is intended to encompass both EMLSR and EMLMR. The links $L_1$-$L_N$ available between MLDs 102 and 104 may be asymmetric links having different link capabilities (e.g. BW, MCS, and/or NSS) and conditions (e.g. loading and/or interference). Hence, the asymmetric links may include one link that has higher performance (i.e. higher effective link throughput) than another link. However, enabling the EMLXR mode on a low performance link will impact the channel access opportunity for a high performance link. To address this issue, the present invention proposes enabling the EMLXR mode on the high performance link only.

Suppose that an MLD (e.g. MLD 102 or 104) has two antennas, one link at 5 GHz band is a high performance link L_HI with higher throughput, and a link at 2.4 GHz is a low performance link L_LO with lower throughput. Regarding a typical multi-link operation (MLO) with no EMLXR as illustrated in a top part of FIG. 2, one MLD may perform frame exchange process on the high performance link L_HI by using a single spatial stream (i.e. 1ss) after gaining access of the high performance link L_HI through channel contention, and may perform frame exchange process on the low performance link L_LO by using a single spatial stream (i.e. 1ss) after gaining access of the low performance link L_LO through channel contention.

Regarding an EMLXR operation with no constraints on the link selection as illustrated in a middle part of FIG. 2, one MLD may enable the EMLXR mode on the high performance link L_HI for performing frame exchange process on the high performance link L_HI by using multiple spatial streams (e.g. 2ss) after gaining access of the high performance link L_HI through channel contention, and may enable the EMLXR mode on the low performance link L_LO for performing frame exchange process on the low performance link L_LO by using multiple spatial streams (e.g. 2ss) after gaining access of the low performance link L_LO through channel contention. In the example shown in FIG. 2, when the MLD gains the access of the low performance link L_LO before gaining the access of the high performance link L_HI, the MLD may enable the EMLXR mode on the low performance link L_LO without considering the channel access opportunity for high performance link L_HI, such that EMLXR operation on the high performance link L_HI is not available to the MLD when the MLD gains the access of the high performance link L_HI later. Since the high performance link L_HI is not used by the MLD for frame exchange during a period in which the low performance link L_LO performs the EMLXR operation, performance loss may occur. To achieve system performance improvement, the present invention proposes a one-way switch EMLXR operation (prioritized EMLXR operation) that is constrained to be enabled on the high performance link only.

Regarding a proposed EMLXR operation with constraints on the link selection as illustrated in a bottom part of FIG. 2, the MLD 102/104 may enable the EMLXR mode on the high performance link L_HI for performing frame exchange process on the high performance link L_HI by using multiple spatial streams (e.g. 2ss) when gaining access of the high performance link L_HI through channel contention, and may block the EMLXR mode from being enabled on the low performance link L_LO when gaining access of the low performance link L_LO through channel contention. In other words, the EMLXR mode is not allowed to be enabled on the low performance link L_LO. In the example shown in FIG. 2, the MLD 102/104 may perform frame exchange process on the high performance link L_HI by using a single spatial stream (i.e. 1ss) for a duration (e.g. transmission opportunity (TXOP) duration) P1 after gaining access of the low performance link L_LO at the time point T1 through channel contention, and may perform frame exchange process on the high performance link L_HI by using a single spatial stream (i.e. 1ss) for a duration (e.g. TXOP duration) P2 after gaining access of the high performance link L_HI at the time point T2 through channel contention. Since there is no EMLSR/EMLMR mode enabled on the low performance link L_LO, the MLD 102/104 has improved channel access opportunity for high performance link L_HI. Specifically, the throughput of a high performance link using one spatial stream and a low performance link using one spatial stream is higher than the throughput of a low performance link using two spatial streams.

By way of example, but not limitation, the processing circuit 112/122 is arranged to deal with the one-way switch EMLXR operation (prioritized EMLXR operation). For example, assuming that there are 4 asymmetric links $L_1$-$L_N$ (N=4), the control registers 118/128 may include a 16-bit control register CR_PER_LINK_EMLSR_EMLMR[0:15]. The 16-bit control register CR_PER_LINK_EMLSR_EMLMR[0:15] records two bits per link, and specifies whether or not a specific link can do EMLSR/EMLMR if the link gets a transmission opportunity through channel contention. More specifically, the 16-bit control register CR_PER_LINK_EMLSR_EMLMR[0:15] specifies the priority of each link, where priority 3>2>1>0 (0:EMLSR/EMLMR is not allowed). An example of the 16-bit control register CR_PER_LINK_EMLSR_EMLMR[0:15] is illustrated in the following table.

| Feature | Link0 | Link1 | Link2 | Link3 |
| --- | --- | --- | --- | --- |
| EMLSR[0:7] | 0 | 1 | 2 | N/A |
| EMLMR[8:15] | 1 | 0 | 2 | N/A |

Hence, regarding the EMLSR operation, link1 and link2 can do EMLSR, link2 has higher priority than link1, and EMLSR is not allowed on link0. In addition, regarding the EMLMR operation, link0 and link2 can do EMLMR, link2 has higher priority than link0, and EMLMR is not allowed on link1.

As shown in FIG. 2, an end time of the duration P1 (i.e. an end time of the frame exchange process on the low performance link L_LO) is not aligned with an end time of the duration P2 (i.e. an end time of the frame exchange process on the high performance link L_HI). It is possible that, while the high performance link L_HI is still occupied by the MLD 102/104 for frame exchange, the MLD 102/104 may gain access of the low performance link L_LO during a backoff procedure after the end time of the duration P2, and then initiates another frame exchange process on the low performance link L_LO by using a single spatial stream. As a result, the non-EMLXR transmission on the low performance link L_LO will impact the opportunity for EMLXR transmission on the high performance link L_HI. To address this issue, the present invention further proposes aligning an end time of non-EMLXR transmission on the low performance link L_LO with an end time of non-EMLXR transmission on the high performance link L_HI, where the high performance link L_HI and the low performance link L_LO are occupied by the same MLD 102/104.

Figure 3:
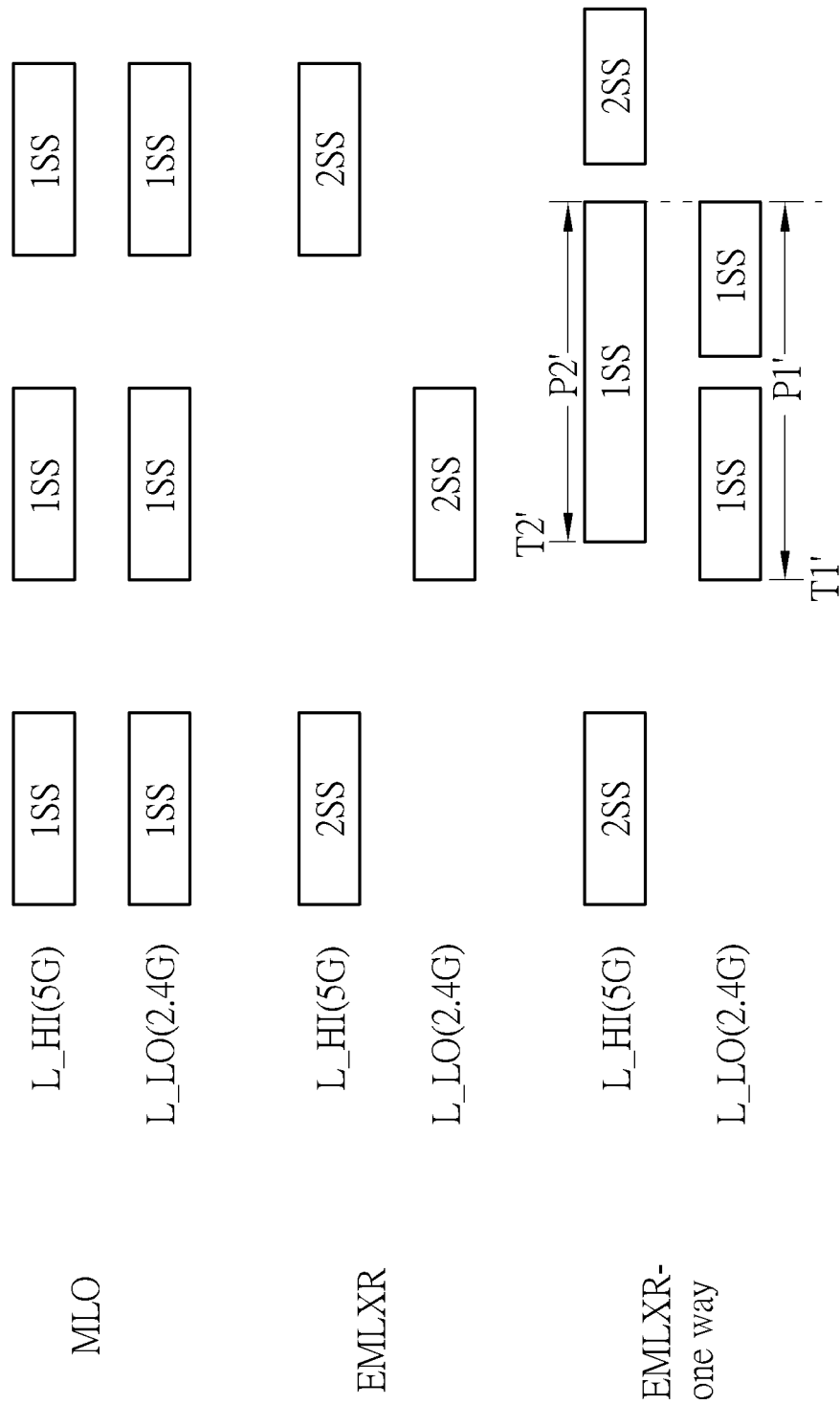
FIG. 3 is a diagram illustrating a multi-link coherent operation with one-way switch EMLXR (prioritized EMLXR) and txOnTx alignment according to an embodiment of the present invention.

FIG. 3 is a diagram illustrating a multi-link coherent operation with one-way switch EMLXR (prioritized EMLXR) and txOnTx alignment according to an embodiment of the present invention. In this embodiment, an EMLXR operation has constraints on the link selection, and a non-EMLXR operation has constraints on the transmission end time. As shown in FIG. 3, the MLD 102/104 does not enable the EMLXR mode on the low performance link L_LO for performing frame exchange process on the low performance link L_LO when gaining access of the low performance link L_LO at the time point T1' through channel contention. Instead, the MLD 102/104 performs frame exchange process on the low performance link L_LO by using a single spatial stream (i.e. 1ss) after gaining access of the low performance link L_LO at the time point T1' through channel contention. Hence, when gaining access of the high performance link L_HI at the time point T2' through channel contention under a condition that the low performance link L_LO is used for frame exchange, the MLD 102/104 is allowed to initiate frame exchange process on the high performance link L_HI by using a single spatial stream (i.e. 1ss).

As shown in FIG. 3, the MLD 102/104 may perform frame exchange process on the high performance link L_LO for a duration (e.g. TXOP duration) P2'. In this embodiment, the MLD 102/104 further controls the frame exchange process on the low performance link L_LO for aligning an end time of a duration P1' (i.e. an end time of frame exchange process on the low performance link L_LO) with an end time of the duration P2' (i.e. an end time of frame exchange process on the high performance link L_HI). Since the end time of the frame exchange process on the low performance link L_LO occupied by the MLD 102/104 is aligned with the end time of the frame exchange process on the high performance link L_HI occupied by the same MLD 102/104, the MLD 102/104 has improved opportunity for EMLXR operation on the high performance link L_HI after the high performance link L_HI becomes idle.

By way of example, but not limitation, the processing circuit 112/122 is arranged to deal with the one-way switch EMLXR operation (prioritized EMLXR operation) with txOnTx alignment. For example, assuming that there are 4 asymmetric links $L_1$-$L_N$ (N=4), the control registers 118/128 may include a 4-bit control register CR_TXONTX_COHERENT_EMLXR[0:3]. The 4-bit control register CR_TXONTX_COHERENT_EMLXR[0:3] records one bit per link, where a value "0" specifies that the MLD cannot do txOnTx alignment, and a value "1" specifies that the MLD can do txOnTx alignment on a lower priority link (e.g., low performance link with priority >0) to align with a higher priority link (e.g. high performance link with highest priority).

In accordance with the one-way switch EMLXR operation (prioritized EMLXR operation) with txOnTx alignment, improved opportunity for EMLXR operation on the high performance link L_HI can be achieved by aligning the end time of the non-EMLXR frame exchange process on the low performance link L_LO occupied by the MLD 102/104 with the end time of the non-EMLXR frame exchange process on the high performance link L_HI occupied by the same MLD 102/104. The same concept may be applied to high performance link L_HI and low performance link L_LO occupied by different Wi-Fi devices. For example, improved opportunity for EMLXR operation on the high performance link L_HI can be obtained by aligning the end time of the EMLXR frame exchange process on the low performance link L_LO occupied by a Wi-Fi device (e.g. one of MLDs 102 and 104) with the end time of the frame exchange process on the high performance link L_HI occupied by another Wi-Fi device (e.g. the other of MLDs 102 and 104).

Figure 4:
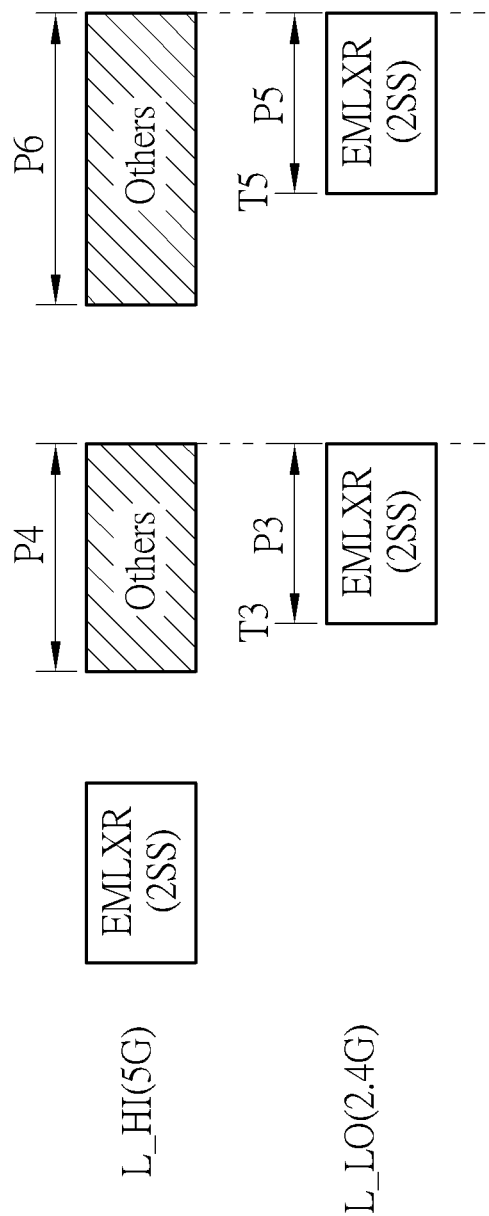
FIG. 4 is a diagram illustrating a multi-link coherent operation with txOnRx alignment according to an embodiment of the present invention.

FIG. 4 is a diagram illustrating a multi-link coherent operation with txOnRx alignment according to an embodiment of the present invention. In this embodiment, an EMLXR operation has constraints on transmission end time. As shown in FIG. 4, the high performance channel L_HI is already occupied by another Wi-Fi device (e.g. one of MLDs 102 and 104) when a Wi-Fi device (e.g. the other of MLDs 102 and 104) gains access of the low performance link L_LO at the time point T3 through channel contention. Hence, the Wi-Fi device (e.g. MLD 102/104) may enable the EMLXR mode on the low performance link L_LO for performing frame exchange process on the low performance link L_LO by using multiple spatial streams (e.g. 2ss) after gaining access of the low performance link L_LO at the time point T3 through channel contention.

For example, the Wi-Fi device (e.g. one of MLDs 102 and 104) may transmit frames/packets to another Wi-Fi device (e.g. the other of MLDs 102 and 104) via the low performance link L_LO, and another Wi-Fi device (e.g. the other of MLDs 102 and 104) may transmit frames/packets to the Wi-Fi device (e.g. one of MLDs 102 and 104) via the high performance link L_LO. In this embodiment, the Wi-Fi device (e.g. MLD 102/104) further controls the frame exchange process on the low performance link L_LO for aligning an end time of a duration P3 (i.e. an end time of frame exchange process on the low performance link L_LO) with an end time of the duration P4 (i.e. an end time of frame exchange process on the high performance link L_HI). Since the end time of the frame exchange process on the low performance link L_LO occupied by the Wi-Fi device (e.g. one of MLDs 102 and 104) is aligned with the end time of the frame exchange process on the high performance link L_HI occupied by another Wi-Fi device (e.g. the other of MLDs 102 and 104), the Wi-Fi device (e.g. one of MLDs 102 and 104) has improved opportunity for EMLXR operation on the high performance link L_HI after the high performance link L_HI becomes idle.

Similarly, the high performance channel L_HI is already occupied by another Wi-Fi device (e.g. one of MLDs 102 and 104) when one Wi-Fi device (e.g. the other of MLDs 102 and 104) gains access of the low performance link L_LO at the time point T5 through channel contention. Hence, the Wi-Fi device (e.g. MLD 102/104) may enable the EMLXR mode on the low performance link L_LO for performing frame exchange process on the low performance link L_LO by using multiple spatial streams (e.g. 2ss) after gaining access of the low performance link L_LO at the time point T5 through channel contention. Since the end time of the frame exchange process on the low performance link L_LO occupied by the Wi-Fi device (e.g. one of MLDs 102 and 104) is aligned with the end time of the frame exchange process on the high performance link L_HI occupied by another Wi-Fi device (e.g. the other of MLDs 102 and 104), the Wi-Fi device (e.g., MLD 102/104) has improved opportunity for EMLXR operation on the high performance link L_HI after the high performance link L_HI becomes idle.

Figure 5:
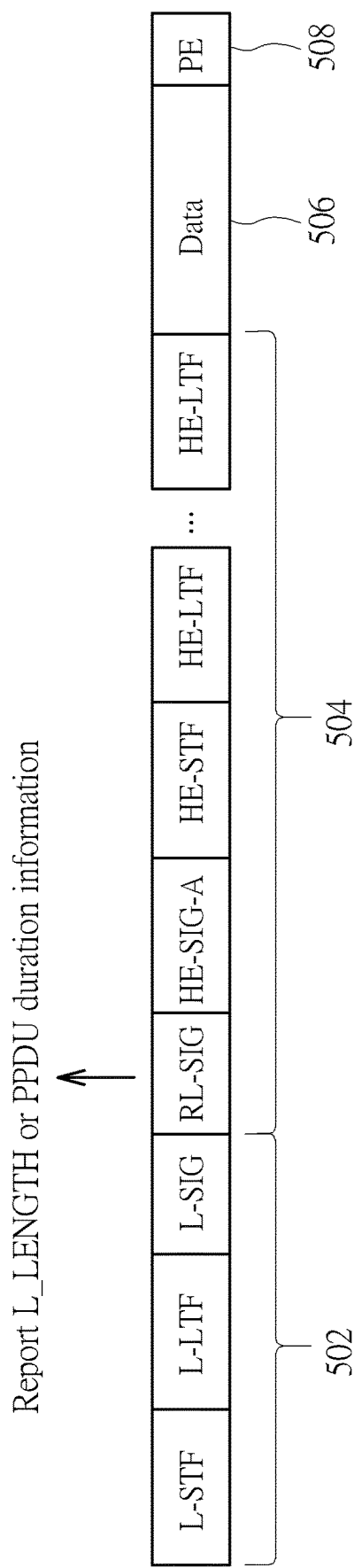
FIG. 5 is a diagram illustrating an 802.11ax high efficiency (HE) frame structure that supports the duration information reporting according to an embodiment of the present invention.

The high performance channel L_HI occupied by another Wi-Fi device (e.g. one of MLDs 102 and 104) may be used for transmitting a frame/packet to the Wi-Fi device (e.g. the other of MLDs 102 and 104). The duration information associated with frame exchange process on the high performance channel L_HI can be obtained before frame exchange process on the low performance link L_LO is initiated. Hence, the duration information associated with frame exchange process on the high performance channel L_HI occupied by another Wi-Fi device can be used for determining the end time of the frame exchange process on the low performance link L_LO. For example, the duration information associated with the frame exchange process on the high performance channel L_HI occupied by another Wi-Fi device (e.g. one of MLDs 102 and 104) can be reported in a preamble of the frame/packet transmitted to the Wi-Fi device (e.g. the other of MLDs 102 and 104). FIG. 5 is a diagram illustrating an 802.11ax high efficiency (HE) frame structure that supports the duration information reporting according to an embodiment of the present invention. In IEEE 802.11ax, an HE Packet Protocol Data Unit (PPDU) may have a legacy preamble 502, an HE preamble 504, HE data 506, and a packet extension (PE) 508. Regarding the legacy preamble 502, it may include a legacy short training field (L-STF), a legacy long training field (L-LTF), a legacy signal filed (L-SIG). Regarding the HE preamble, it may include a repeated L-SIG (RL-SIG) field, an HE-SIG-A field, an HE-STF field, and HE-LTF fields. The L LENGTH or PPDU duration may be reported as early as possible. For example, it may be reported when L-SIG is detected or may be reported any time after L-SIG is detected, depending upon the actual hardware implementation.

By way of example, but not limitation, the processing circuit 112/122 is arranged to deal with the txOnRx alignment. For example, assuming that there are 4 asymmetric links $L_1$-$L_N$ (N=4), the control registers 118/128 may include a 4-bit control register CR_TXONRX_COHERENT_EMLXR[0:3], a 16-bit control resister CR_TXONRX_SNG_DURATION_OFFSET_COHERENT_EXMLXR[0:15], and a 16-bit control register CR_TXONRX_DURATION_THRESHOLD_COHERENT_EXMLLXR[0:15]. The 4-bit control register CR_TXONRX_COHERENT_EMLXR[0:3] records one bit per link, where a value "0" specifies that the MLD cannot do txonRx alignment for this link, and a value "1" specifies that the MLD can do txOnRx alignment for this link. The 16-bit control register CR_TXONRX_SNG_DURATION_OFFSET_COHERENT_EXMLXR[0:15] records an offset OFS of TXTIME for RXTIME $$\text{(e.g. } RXTIME(\mu s) = \frac{L\_LENGTH + 3}{3} \cdot 4 + 20),$$

where TXTIME=RXTIME-OFS, TXTIME is the duration of frame exchange process on the low performance link, and RXTIME is the duration of frame exchange process on the high performance link. Hence, aligning the end time of the frame exchange process on the low performance link with the end time of the frame exchange process on the high performance link may make the end time of the frame exchange process on the low performance link exactly the same as the end time of the frame exchange process on the high performance link (i.e. OFS=0), or may make the end time of the frame exchange process on the low performance link shifted from the end time of the frame exchange process on the high performance link by a fixed offset (i.e. OFS≠0). The 16-bit control register CR_TXONRX_DURATION_THRESHOLD_COHERENT_EXMLLXR[0:15] records a threshold TH for determining whether to perform txOnRx alignment. If RXTIME>TH, the MLD can do txOnRx alignment fora link. Otherwise, no txOnRx alignment is performed for a link.

Figure 6:
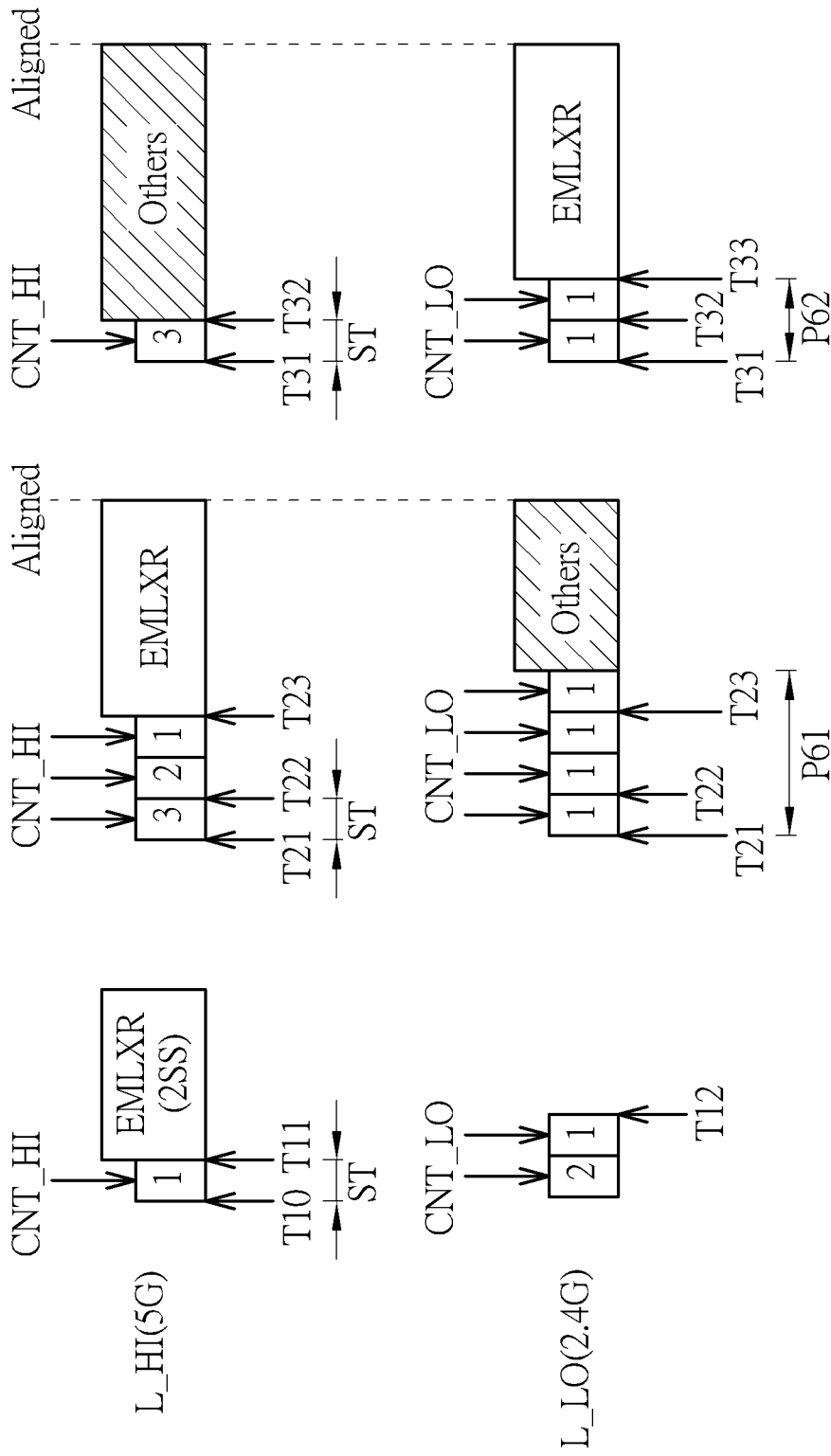
FIG. 6 is a diagram illustrating a multi-link coherent operation with txOnRx alignment and prioritized channel access according to an embodiment of the present invention.

The feature of txOnRx alignment may work with other feature (s) to further enhance the system performance. FIG. 6 is a diagram illustrating a multi-link coherent operation with txOnRx alignment and prioritized channel access according to an embodiment of the present invention. In this embodiment, an EMLXR operation has constraints on transmission end time, and a backoff counter for a low performance link may be held to wait for the chance of gaining access of a high performance link. As shown in FIG. 6, one backoff counter CNT_HI is used by the MLD 102/104 in a backoff procedure of the high performance link L_HI, and another backoff counter CNT_LO is used by the MLD 102/104 in a backoff procedure of the low performance link L_LO. When the backoff counter CNT_HI reaches 0 and the high performance link L_HI is not occupied by other Wi-Fi device (s) yet (i.e. the high performance link L_HI is idle), the MLD 102/104 may gain access of the high performance link L_HI through channel contention.

Similarly, when the backoff counter CNT_LO reaches 0 and the low performance link L_LO is not occupied by other Wi-Fi device(s) yet (i.e. the low performance link L_LO is idle), the MLD 102/104 may gain access of the low performance link L_LO through channel contention. As shown in a left part of FIG. 6, the backoff counter CNT_HI reaches 1 at the time point T10, and then reaches 0 after one slot time ST, if the high performance link L_HI remains idle. Hence, assuming that the high performance link L_HI and the low performance link L_LO are both idle, the backoff counter CNT_HI reaches 0 at the time point T11 before the backoff counter CNT_LO reaches 0 at the time point T12. Since the high performance link L_HI is not occupied at the time point T11, the MLD 102/104 may enable the EMLXR mode on the high performance link L_HI for performing frame exchange process on the high performance link L_HI by using multiple spatial streams (e.g. 2ss) after gaining access of the high performance link L_HI at the time point T11 through channel contention.

As shown in a middle part of FIG. 6, the backoff counter CNT_HI reaches 3 at the time point T21, and the backoff counter CNT_LO reaches 1 at the time point T21. In a case where the backoff counter CNT_LO is not held by the proposed prioritized channel access mechanism, the backoff counter CNT_LO will become 0 at the time point T22, if the low performance link L_LO remains idle. That is, the backoff counter CNT_LO will become 0 after one slot time ST. Since the backoff counter CNT_HI reaches 2 at the time point T22, the MLD 102/104 cannot gain access of the high performance link L_HI through channel contention yet. If the MLD 102/104 gains access of the low performance link L_LO at the time point T22 before the backoff counter CNT_HI reaches 0 at the time point T23, the MLD 102/104 may enable the EMLXR mode on the low performance link L_LO, which prevents the MLD 102/104 from performing EMLXR operation on the high performance link L_HI when gaining access of the high performance link L_HI at the later time point T23. To address this issue, the present invention proposes holding the backoff counter CNT_LO to wait for the chance of gaining access of the high performance link L_HI. Specifically, before the backoff counter CNT_LO reaches 0 under a condition that the high performance link L_HI is not occupied yet, the MLD 102/104 may hold the backoff counter CNT_LO for one or more slot times to wait for the chance of gaining access of the high performance link L_HI through channel contention.

As shown in the middle part of FIG. 6, the backoff counter CNT_LO is held during a period P61, and the backoff counter CNT_HI reaches 0 within the period P61. Hence, when the backoff counter CNT_HI reaches 0 at the time point T23, the backoff counter CNT_LO is still held at a non-zero value (e.g. 1). Hence, the MLD 102/104 may enable the EMLXR mode on the high performance link L_HI by using multiple spatial streams (e.g. 2ss) after gaining access of the high performance link L_HI at the time point T23 during the period P61 in which the backoff counter CNT_LO is held. It should be noted that, since the backoff counter CNT_LO is held at a non-zero value, it is possible that another Wi-Fi device may gain access of the low performance link L_LO during the period P61, and use the low performance link L_LO for frame exchange. To put it simply, when the high performance link is not occupied yet, the MLD 102/104 will try to gain access of the high performance link first by properly delaying the channel access opportunity for low performance link.

As shown in a right part of FIG. 6, the backoff counter CNT_HI reaches 3 at the time point T31, and the backoff counter CNT_LO reaches 1 at the time point T31. If the backoff counter CNT_LO is not held by the proposed prioritized channel access mechanism, the backoff counter CNT_LO will reach 0 at the time point T32, if the low performance link L_LO remains idle. If the backoff counter CNT_HI reaches 2 at the time point T32, the MLD 102/104 cannot gain access of the high performance link L_HI through channel contention yet. To address this issue, the present invention proposes holding the backoff counter CNT_LO to wait for the chance of gaining access of the high performance link L_HI. In this example, before the backoff counter CNT_HI reaches 0, another Wi-Fi device occupies the high performance link L_HI during a period P62 in which the backoff counter CNT_LO is held. In response to the high performance link L_HI occupied by the another Wi-Fi device, the MLD 102/104 resumes backoff countdown of the backoff counter CNT_LO, thereby allowing channel access opportunity for low performance link L_LO. For example, the backoff counter CNT_LO reaches 0 at time T33. Hence, the MLD 102/104 may enable the EMLXR mode on the low performance link L_LO by using multiple spatial streams (e.g. 2ss) after gaining access of the low performance link L_LO at the time point T33. To put it simply, the MLD 102/104 only accesses the low performance link when the high performance link is occupied/busy.

In a case where there are multiple MLDs all employing the proposed prioritized channel access mechanism, it is possible that backoff counters CNT_LO of two or more MLDs are held to keep the same non-zero value (e.g. 1) at the time the high performance link L_HI is occupied by another Wi-Fi device. When the backoff counters CNT_LO of these MLDs resume respective backoff countdown at the same time, collisions may occur. To address this issue, the present invention further proposes introducing extra random slot times before resuming the backoff countdown of the backoff counter CNT_LO. That is, before resuming backoff countdown of the backoff counter CNT_LO in response to the high performance link L_HI being occupied by another Wi-Fi device during the period P62 in which the backoff counter CNT_LO is held, the MLD 102/104 may hold the backoff counter CNT_LO for extra random slot times. For example, the MLD 102/104 may randomly extend the period P62 by holding the backoff counter CNT_LO for extra random slot times introduced after the time point T33. In this way, collisions may be mitigated due to the intentionally introduced randomness.

By way of example, but not limitation, the processing circuit 112/122 is arranged to deal with the prioritized channel access. For example, assuming that there are 4 asymmetric links $L_1$-$L_N$ (N=4), the control registers 118/128 may include an 8-bit control register CR_WAITSLOT_PIFS_COHERENT_EMLXR[0:7] and a 4-bit control register CR_EXTRA_RANDOM_SLOT_COHERENT_EMLXR[0:3]. The 8-bit control register CR_WAITSLOT_PIFS_COHERENT_EMLXR[0:7] records two bits per link, where a value "0" specifies that there is no wait-slot and PIFS (Point Coordination Function Interframe Space) for the link, a value "1" specifies that there is wait-slot for the link, a value "2" specifies that there is PIFS for the link, and a value "3" is not applicable. The 4-bit control register CR_EXTRA_RANDOM_SLOT_COHERENT_EMLXR [0:3] records one bit per link, where a value "0" specifies that no extra random slots are introduced, and a value "1" specifies that extra random slots are introduced.

Regarding the aforementioned txOnRx alignment shown in FIG. 4, improved opportunity for EMLXR operation on the high performance link L_HI can be achieved by aligning the end time of the frame exchange process on the low performance link L_LO occupied by one Wi-Fi device with the end time of the frame exchange process on the high performance link L_HI occupied by another Wi-Fi device, where the duration information associated with the frame exchange process on the high performance link L_HI can be obtained before the frame exchange process on the low performance link L_LO is initiated. However, regarding certain scenarios, it is possible that the duration information associated with frame exchange process on the high performance link L_HI is available after frame exchange process on the low performance link L_LO is already initiated. The present invention proposes memorizing duration information associated with frame exchange process on the high performance link L_HI and achieving txOnRx alignment by using one or more frame exchange sequences that are initiated after the duration information is obtained. For example, a frame exchange sequence may include one or more frames/packets exchanged between two Wi-Fi devices (e.g. MLDs 102 and 104).

Figure 7:
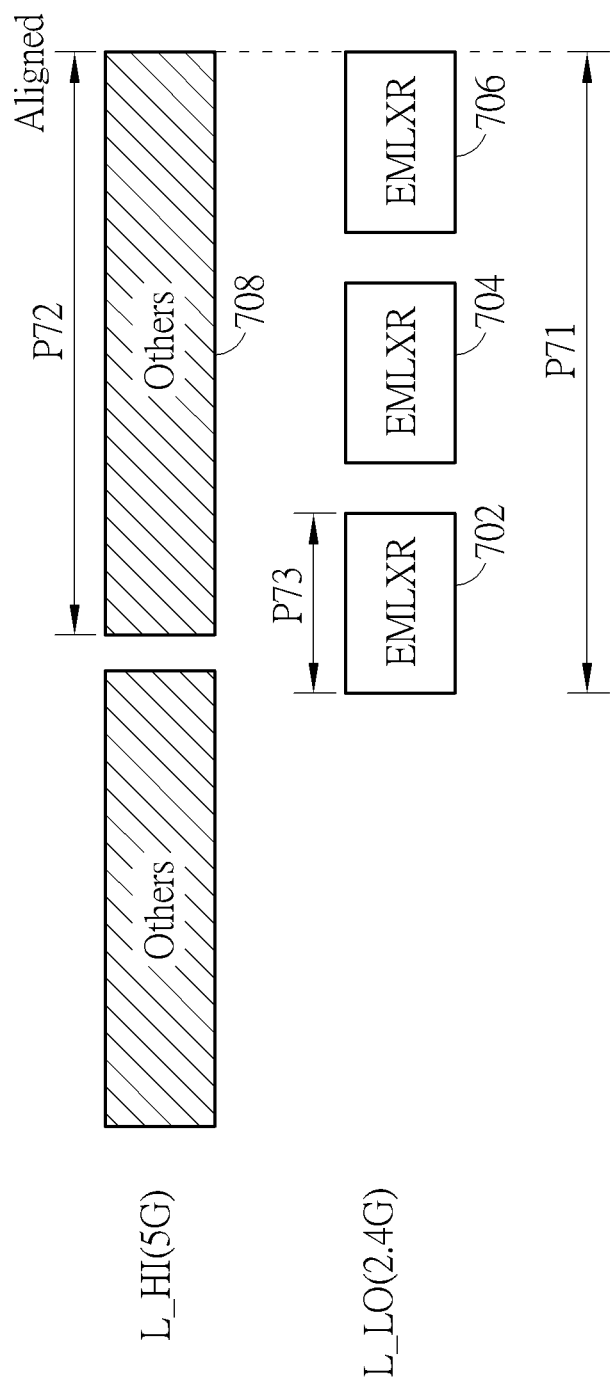
FIG. 7 is a diagram illustrating a multi-link coherent operation with multiple txOnRx alignment according to an embodiment of the present invention.

FIG. 7 is a diagram illustrating a multi-link coherent operation with multiple txOnRx alignment according to an embodiment of the present invention. In this embodiment, an EMLXR operation has constraints on transmission end time. As shown in FIG. 7, the high performance channel L_HI is occupied by another Wi-Fi device (e.g. one of MLDs 102 and 104) when a Wi-Fi device (e.g. the other of MLDs 102 and 104) gains access of the low performance link L_LO through channel contention. The Wi-Fi deice (e.g. MLD 102/104) may enable the EMLXR mode on the low performance link L_LO for performing frame exchange process on the low performance link L_LO by using multiple spatial streams (e.g. 2ss) after gaining access of the low performance link L_LO. In this example, the duration information associated with frame exchange process on the high performance channel L_HI (e.g. L LENGTH or PPDU duration of the frame transmitted to the Wi-Fi device within the duration P72) is obtained after frame exchange process on the low performance link L_LO is initiated.

Specifically, the duration information associated with the frame exchange sequence 708 is obtained during a period P73 in which the frame exchange sequence 702 occurs on the low performance link L_LO. Hence, the duration information associated with frame exchange process on the high performance link L_HI is memorized and then referenced for determining an end time of the frame exchange process on the low performance link L_LO. As shown in FIG. 7, multiple frame exchange sequences 704 and 706 following the frame exchange sequence 702 are initiated by the Wi-Fi device (e.g. MLD 102/104) within the duration (e.g. TXOP duration) P71, where an end time of the duration P71 (i.e. an end time of frame exchange process on the low performance link L_LO) is aligned with an end time of the frame exchange process on the high performance link L_HI. It should be noted that the number of frame exchange sequences actually involved in txOnRx alignment may vary for different scenarios.

Figure 8:
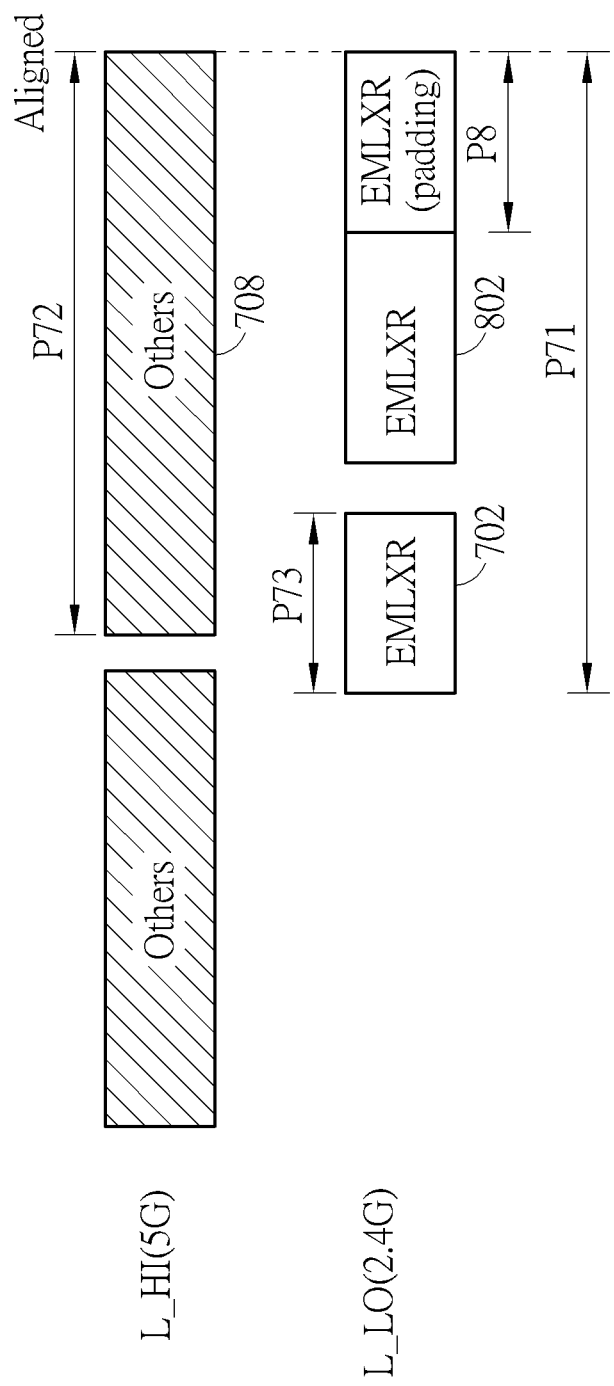
FIG. 8 is a diagram illustrating another multi-link coherent operation with multiple txOnRx alignment according to an embodiment of the present invention.

FIG. 8 is a diagram illustrating another multi-link coherent operation with multiple txOnRx alignment according to an embodiment of the present invention. The major difference between the embodiments shown in FIG. 7 and FIG. 8 is that the frame exchange sequence 802 (which is the last frame exchange sequence) may include padding bits (dummy bits) added in an extended duration P8 for achieving the same objective of aligning an end time of the duration P71 (i.e. an end time of frame exchange process on the low performance link L_LO) with an end time of the frame exchange process on the high performance link L_HI.

Regarding the embodiments shown in FIG. 7 and FIG. 8, since the end time of frame exchange process on the low performance link L_LO occupied by one Wi-Fi device (e.g. one of MLDs 102 and 104) is aligned with the end time of frame exchange process on the high performance link L_HI occupied by another Wi-Fi device (e.g. the other of MLDs 102 and 104), the Wi-Fi device (e.g. MLD 102/104) has improved opportunity for EMLXR operation on the high performance link L_HI after the high performance link L_HI becomes idle.

By way of example, but not limitation, the processing circuit 112/122 is arranged to deal with the multiple txOnRx alignment. For example, assuming that there are 4 asymmetric links $L_1$-$L_N$ (N=4), the control registers 118/128 may include a 4-bit control register CR_MTXONRX_COHERENT_EMLXR[0:3], a 16-bit control register CR_EXTEND_DURATION_TXONRX_COHERENT_EMLXR[0:15], and a 4-bit control register CR_EXTEND_TXONRX_COHERENT_EMLXR[0:3]. The 4-bit control register CR_MTXONRX_COHERENT_EMLXR[0:3] records one bit per link, where a value "0" specifies that there is no multiple txOnRX alignment for the link, and a value "1" specifies that there is multiple txOnRX alignment for the link. The 16-bit control register CR_EXTEND_DURATION_TXONRX_COHERENT_EMLXR[0:15] and the 4-bit control register CR_EXTEND_TXONRX_COHERENT_EMLXR[0:3] are used for padding control. The 16-bit control register CR_EXTEND_DURATION_TXONRX_COHERENT_EMLXR[0:15] specifies a maximum padding duration. The 4-bit control register CR_EXTEND_TXONRX_COHERENT_EMLXR [0:3] records one bit per link, where a value "0" specifies that there is no txOnRx extension (padding), and a value "1" specifies that there is txOnRx extension (padding), wherein the extended duration P8 is shorter than the maximum padding duration specified by the control register CR_EXTEND_DURATION_TXONRX_COHERENT_EMLXR[0:15].

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method employed by a wireless fidelity (Wi-Fi) multi-link device (MLD), comprising:
    in response to gaining access of a first link at a first time point through channel contention, enabling a multi-link coherent operation mode on the first link for performing frame exchange process on the first link by using N spatial streams, wherein N is a positive integer not smaller than 2; and
    in response to gaining access of a second link at a second time point through channel contention, blocking the multi-link coherent operation mode from being enabled on the second link, wherein performance of the second link is lower than performance of the first link.

2. The control method of claim 1, further comprising:
in response to gaining access of the second link at the second time point through channel contention, performing frame exchange process on the second link by using M spatial streams for a first duration, where M is a positive integer smaller than N.

3. The control method of claim 2, wherein M is equal to 1.

4. The control method of claim 2, further comprising:
in response to gaining access of the first link at a third time point through channel contention, performing frame exchange process on the first link by using L spatial streams for a second duration, where L is a positive integer smaller than N, and the second duration overlaps the first duration.

5. The control method of claim 4, wherein each of M and L is equal to 1.

6. The method of claim 4, further comprising:
aligning an end time of the first duration with an end time of the second duration.

7. The control method of claim 1, wherein the multi-link coherent operation mode is an enhanced multi-link single-radio (EMLSR) mode.

8. The control method of claim 1, wherein the multi-link coherent operation mode is an enhanced multi-link multi-radio (EMLMR) mode.

9. A control method employed by a wireless fidelity (Wi-Fi) multi-link device (MLD), comprising:
in response to gaining access of a first link through channel contention, enabling a multi-link coherent operation mode on the first link for performing frame exchange process on the first link by using N spatial streams, and aligning an end time of the frame exchange process on the first link with an end time of another frame change process that is performed on a second link occupied by another Wi-Fi device, wherein performance of the second link is higher than performance of the first link, and N is a positive integer not smaller than 2.

10. The control method of claim 9, further comprising:
before initiating the frame exchange process on the first link, obtaining duration information associated with said another frame change process on the second link;
wherein aligning the end time of the frame exchange process on the first link with the end time of said another frame change process comprises:
determining the end time of the frame exchange process on the first link according to the duration information.

11. The control method of claim 9, further comprising:
after initiating the frame exchange process on the first link, obtaining and memorizing duration information associated with said another frame change process on the second link;

wherein aligning the end time of the frame exchange process on the first link with the end time of another frame change process comprises:
determining the end time of the frame exchange process on the first link according to the duration information.

12. The control method of claim 11, wherein the frame exchange process on the first link comprises one or more frame exchange sequences that are initiated after the duration information is obtained.

13. The control method of claim 12, wherein a last frame exchange sequence included in the frame exchange process on the first link contains padding bits.

14. The control method of claim 9, wherein the multi-link coherent operation mode is an enhanced multi-link single-radio (EMLSR) mode.

15. The control method of claim 9, wherein the multi-link coherent operation mode is an enhanced multi-link multi-radio (EMLMR) mode.

16. A control method employed by a wireless fidelity (Wi-Fi) multi-link device (MLD), comprising:
before a first backoff counter of a first link reaches zero under a condition that a second link is not occupied yet, holding the first backoff counter for one or more slot times to wait for the chance of gaining access of the second link through channel contention, wherein performance of the second link is higher than performance of the first link.

17. The control method of claim 16, further comprising:
in response to a second backoff counter of the second link reaching zero during a period in which the first backoff counter is held, enabling a multi-link coherent operation mode on the second link for performing frame exchange process on the second link by using N spatial streams, wherein N is a positive integer not smaller than 2.

18. The control method of claim 17, wherein the multi-link coherent operation mode is an enhanced multi-link single-radio (EMLSR) mode.

19. The control method of claim 17, wherein the multi-link coherent operation mode is an enhanced multi-link multi-radio (EMLMR) mode.

20. The control method of claim 16, further comprising:
in response to the second link being occupied by another Wi-Fi device during a period in which the first backoff counter is held, resuming backoff countdown of the first backoff counter.

21. The control method of claim 20, wherein resuming backoff countdown of the first backoff counter comprises:
before resuming backoff countdown of the first backoff, holding the first backoff counter for extra random slot times.

* * * * *